United States Patent
Ogawa et al.

(10) Patent No.: US 7,222,914 B2
(45) Date of Patent: May 29, 2007

(54) SURFACE COVERING MATERIALS OF VEHICLE SUN VISORS AND VEHICLE SUN VISORS HAVING THE SURFACE COVERING MATERIALS

(75) Inventors: Hiroto Ogawa, Toyota (JP); Norimitsu Kitazawa, Moriyama (JP); Kazuhito Yoshikawa, Moriyama (JP)

(73) Assignee: Kyowa Sangyo Co. Ltd, Toyota-shi, Aichi-ken (JP)

( * ) Notice: Subject to any disclaimer, the term of this patent is extended or adjusted under 35 U.S.C. 154(b) by 0 days.

(21) Appl. No.: 11/125,434

(22) Filed: May 10, 2005

(65) Prior Publication Data
US 2005/0248178 A1  Nov. 10, 2005

(30) Foreign Application Priority Data
May 10, 2004 (JP) .............................. 2004-139903

(51) Int. Cl.
B60J 3/00  (2006.01)
(52) U.S. Cl. ..................... 297/97.2; 297/97.1
(58) Field of Classification Search ............... 296/97.1, 296/97.2
See application file for complete search history.

(56) References Cited
U.S. PATENT DOCUMENTS 4,458,938 A * 7/1984 Viertel et al. ............... 296/97.1
4,998,767 A * 3/1991 Lawassani et al. ......... 296/97.1
5,031,951 A * 7/1991 Binish ........................ 296/97.1
5,056,852 A * 10/1991 Miller ........................ 296/97.1
5,108,143 A * 4/1992 Miwa ......................... 296/97.1
5,148,588 A * 9/1992 Prillard ....................... 296/97.1
6,612,637 B1 * 9/2003 Crotty, III .................. 296/97.1
2003/0168877 A1 * 9/2003 Esteban ..................... 296/97.1
2004/0051337 A1 * 3/2004 Eich .......................... 296/97.5
2004/0266294 A1 * 12/2004 Rowen ....................... 442/149

FOREIGN PATENT DOCUMENTS

JP  6-255044  9/1994

* cited by examiner

Primary Examiner—Lori L. Lyjak
(74) Attorney, Agent, or Firm—Conley Rose, P.C.

(57) ABSTRACT

A surface covering material for use with a vehicle sun visor includes a non-woven fabric layer and a synthetic resin layer overlaid onto a back surface of the non-woven fabric layer. The density of the non-woven fabric layer is between 120 g/m and 250 g/m. The non-woven fabric layer preferably includes a binder resin. The thickness of the synthetic resin layer is between 30 μm and 50 μm. A vehicle sun visor may be covered with such a surface covering material.

17 Claims, 5 Drawing Sheets

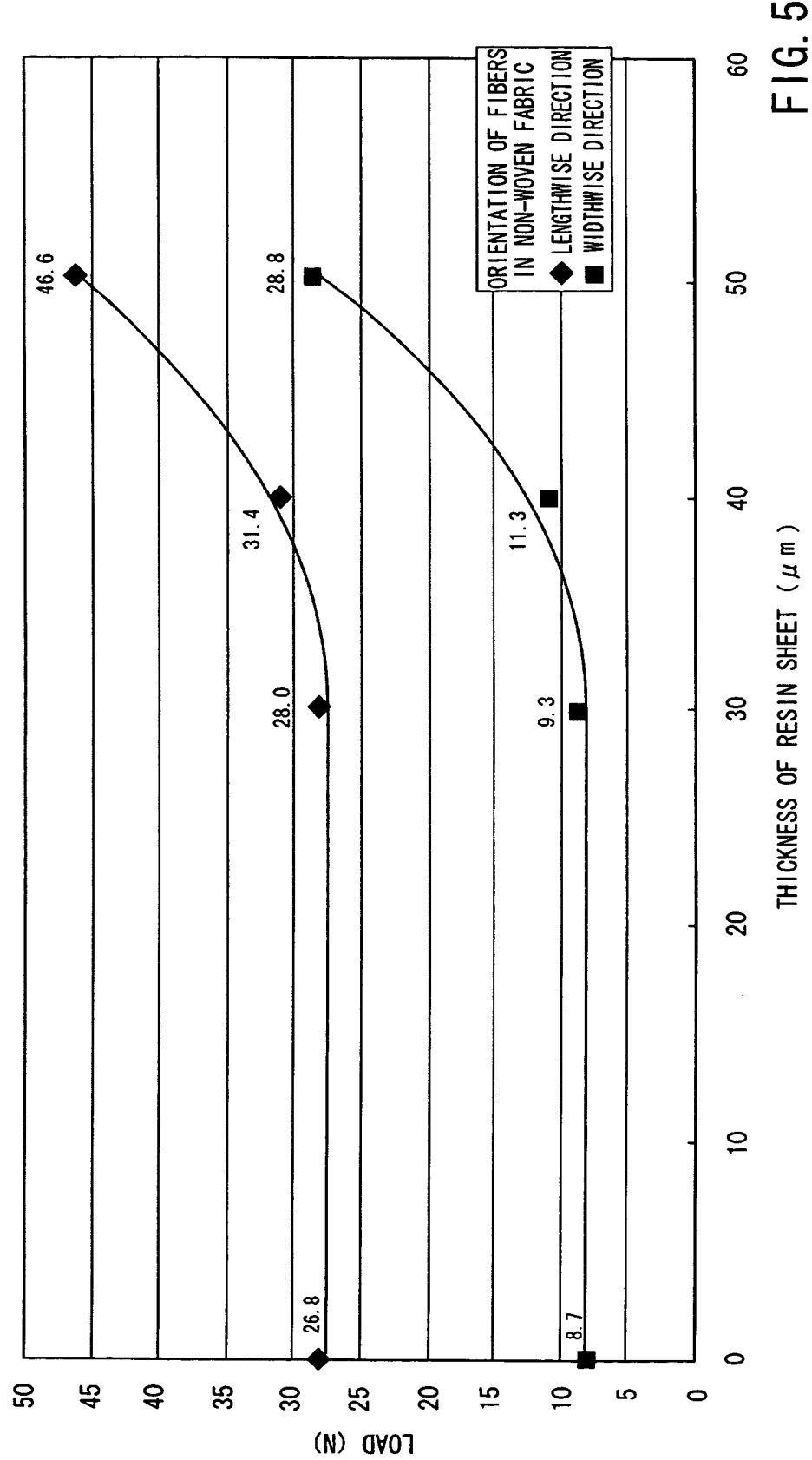

SURFACE COVERING MATERIALS OF VEHICLE SUN VISORS AND VEHICLE SUN VISORS HAVING THE SURFACE COVERING MATERIALS

This application claims priority to Japanese patent application serial number 2004-139903, the contents of which are incorporated herein by reference.

BACKGROUND OF THE INVENTION

1. Field of the Invention

The present invention relates to surface covering materials of vehicle sun visors and vehicle sun visors having such surface covering materials.

2. Description of the Related Art

Japanese Laid-Open Patent Publication No. 6-255044 teaches a surface covering material that covers an outer surface of a vehicle sun visor. The surface covering material disclosed in this publication is manufactured by laminating a poly vinyl chloride film having a thickness of 250-500 μm onto a non-woven fabric entirely impregnated with resin. According to this publication, when the sheets of the surface covering material thus manufactured have been bonded together along the outer circumference of the sun visor by a high-frequency welding process, a sufficient bonding strength can be obtained at the bonded region inasmuch as the sheets are not readily peeled off from each other at the bonded region.

In order to cover the surface of the sun visor with a surface covering material in such a manner that the surface covering material has a tension across the surface of the sun visor, the sheets of the surface covering material are cut to have a size slightly smaller than the size of the sun visor. The outer surface of the sun visor is covered with the sheets while stretching the sheets. As a result, the surface covering material of the above publication may be tensioned due to the restoring force of the resin film that has been laminated onto the back surface of the non-woven fabric layer.

However, during a long time period of use of the sun visor, the resin film laminated onto the back surface of the non-fabric layer may acquire a permanent set. As a result, the surface covering material may sag or may cause bunching along the outer surface of the sun visor.

SUMMARY OF THE INVENTION

It is accordingly an object of the present invention to teach a surface covering material for a vehicle sun visor, which can reliably maintain a tensioned condition, thereby giving the sun visor a good appearance. It is also an object of the present invention to teach a sun visor having such a surface covering material.

In one aspect of the present teachings, surface covering materials for use with vehicle sun visors are taught. The surface covering materials include a non-woven fabric layer and a synthetic resin layer overlaid on the back surface of the non-woven fabric layer. The thickness of the synthetic resin layer is between 30 μm and 50 μm. Here, the term "thickness" of the synthetic resin layer is used to mean the thickness of the synthetic resin before using the surface covering material to cover the sun visor, where no tensile force is applied to the surface covering material (i.e., a natural unstressed condition).

With this determination of the thickness of the synthetic resin layer, the operation for covering the sun visor with the surface covering material can be easily performed. In addition, the surface covering material may exhibit a good recovery property opposing the stretching.

In one embodiment the synthetic resin layer is made of a polypropylene resin. With the selection of this resin material it is possible to have a surface covering material that generates a minimum level of environmental pollutant gases when disposed of by incineration, in comparison with surface covering materials made of poly vinyl chloride (i.e., PVC).

In another embodiment, the weight per unit area of the non-woven fabric layer is between 120 g/m$^2$ and 250 g/m$^2$. Here the term "weight per unit area" of the non-woven fabric layer is used with regard to the area of the synthetic resin before the surface covering material is used to cover the sun visor, where no tensile force is applied to the surface cover material (i.e., a natural unstressed condition). With the selection of this weight per unit area, the visor body of the sun visor may not be visible through the surface covering material. In addition, it is possible to realize a surface cover material that can appropriately follow the surface configuration of the visor body.

In another embodiment, the non-woven fabric layer comprises a non-woven fabric made of polyester fibers. Optionally, the non-woven fabric layer may further comprise a binder resin contained in the non-woven fabric.

In another aspect of the present teachings, vehicle sun visors are taught that are covered with the surface covering material as described in the above aspects and embodiments. Therefore, the sun visor may be covered with a surface covering material that properly follows the configuration of the outer surface of the sun visor.

BRIEF DESCRIPTION OF THE DRAWINGS

FIG. 5 is a graph showing the result of measurements of modulus loads for representative surface covering materials.

DETAILED DESCRIPTION OF THE INVENTION

Figure 1:
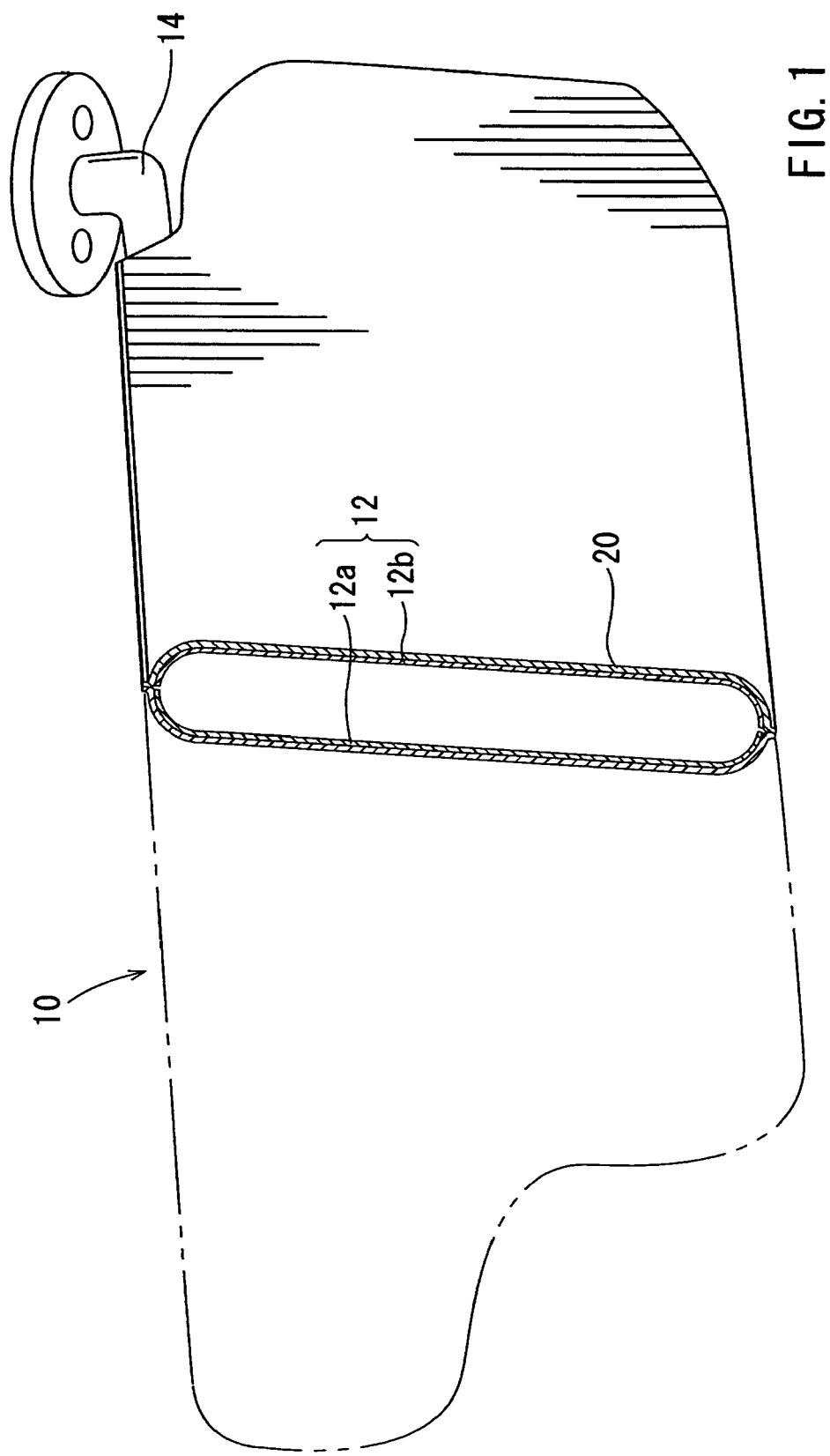
FIG. 1 is a perspective view of a vehicle sun visor according to a representative embodiment of the present invention.

Each of the additional features and teachings disclosed above and below may be utilized separately or in conjunction with other features and teachings to provide improved surface covering materials for vehicle sun visors and methods of manufacturing such surface covering materials and sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment of the present invention will now be described. A representative surface covering material for a vehicle sun visor has a non-woven fabric layer and a synthetic resin layer. The synthetic resin layer has a thickness between 30 μm and 50 μm and may be overlaid on a back surface of the non-woven fabric layer. The back surface of the non-woven fabric layer is a surface coming into contact with an outer surface of a sun visor, i.e., an inner surface of the surface covering material.

Preferred fibers for use with the non-woven fabric layer include, but are not limited to, the following: synthetic fibers including polyester fibers, polyethylene fibers, polypropylene fibers, poly vinylidene chloride fibers, poly amide fibers, acrylic fibers, and ethylene-vinyl acetate copolymer fibers; semi-synthetic fibers including rayon fibers and acetate fibers; natural fibers including cotton fibers and wool fibers; and mixtures or combinations of two or more of these fibers. However, among these fibers, polyester fibers are most preferable, because polyester fibers exhibit good heat resistance and good weather or environmental resistance.

In order to form the above fibers into non-woven fabrics, various techniques are known, such as a fiber bonding technique, a print bonding technique, a needle punching technique, and a water flow entangling technique. The needle punching technique is most preferably used when taking into account the thickness, strength, and formability, of the resulted non-woven fabrics.

Preferred weight per unit area of the non-woven fabric is between 120 g/m$^2$ and 250 g/m$^2$. If the weight is less than 120 g/m$^2$, there is a possibility that the body of the sun visor covered with the surface covering material may be visible through the surface covering material. On the contrary, if the weight is greater than 250 g/m$^2$, there will be a possibility that the thickness of the non-woven fabric becomes too large, thereby lowering the flexibility of the non-woven fabric and causing difficulties in having the non-woven fabric follow the configuration of the outer surface of the sun visor. In this specification, "weight per unit area" is measured for the non-woven fabric before covering the sun visor and with the condition that no external tensional force is applied to the non-woven fabric (i.e., a natural unstressed condition).

Preferably, the non-woven fabric may contain a binder resin. A non-woven fabric containing a binder resin may exhibit a good ability to maintain a desired configuration. Preferred binder resins for use with the non-woven fabric include, but are not limited to, the following: poly vinyl chloride resin, acrylic resin, vinyl chloride-acrylic resin, ethylene-vinyl acetate resin, ethylene-vinyl acetate-acrylic resin, ethylene-vinyl acetate-vinyl chloride resin, poly vinylidene chloride-acrylic resin, and combinations thereof. Among these resins, acrylic resin is the most preferably used resin.

In order to impregnate the binder resin into the non-woven fabric, various techniques can be used. For example, the binder resin may be emulsified and may then be applied to the non-woven fabric via spraying. Alternatively, the non-woven fabric may be immersed into a bath of the emulsified binder resin. When desired, a fire resistant agent may be employed. For example, phosphorus, phosphorus-halogen, or halogen fire resistant agents may be used.

A sheet made of thermoplastic, such as polypropylene and poly vinyl chloride, may preferably be used as the synthetic resin layer to be overlaid on the back surface of the non-woven fabric layer. A sheet made of polypropylene may preferably be used if the reduction of the generation of gas that may deteriorate the environment is desired. Various techniques may be used in order to overlay the synthetic resin layer onto the back surface of the non-woven fabric layer. For example, the synthetic resin layer may be laminated via an adhesive agent onto the non-woven fabric layer (i.e., a lamination technique). Alternatively, a synthetic resin sheet may be heated and laminated directly onto the non-woven fabric layer in order to form the synthetic resin layer. For example, at least a part of a synthetic resin sheet on the side to be opposed to the non-woven fabric layer may be heated to be melted. Then, the melted synthetic resin sheet may be overlaid with the non-woven fabric and may thereafter be cooled to be directly bonded to the non-woven fabric.

Preferably, the synthetic resin layer may have a thickness between 30 μm and 50 μm. In this specification, the "thickness" of the synthetic resin layer is measured prior to covering the sun visor and with the condition that no external tensional force is applied to the synthetic resin layer (i.e., a natural unstressed condition). With the setting of this thickness range for the synthetic resin layer, the operation for covering the sun visor with the surface cover material can be easily performed. In addition, it is possible to realize the surface covering material that has a good recovery property against stretching.

Figure 2:
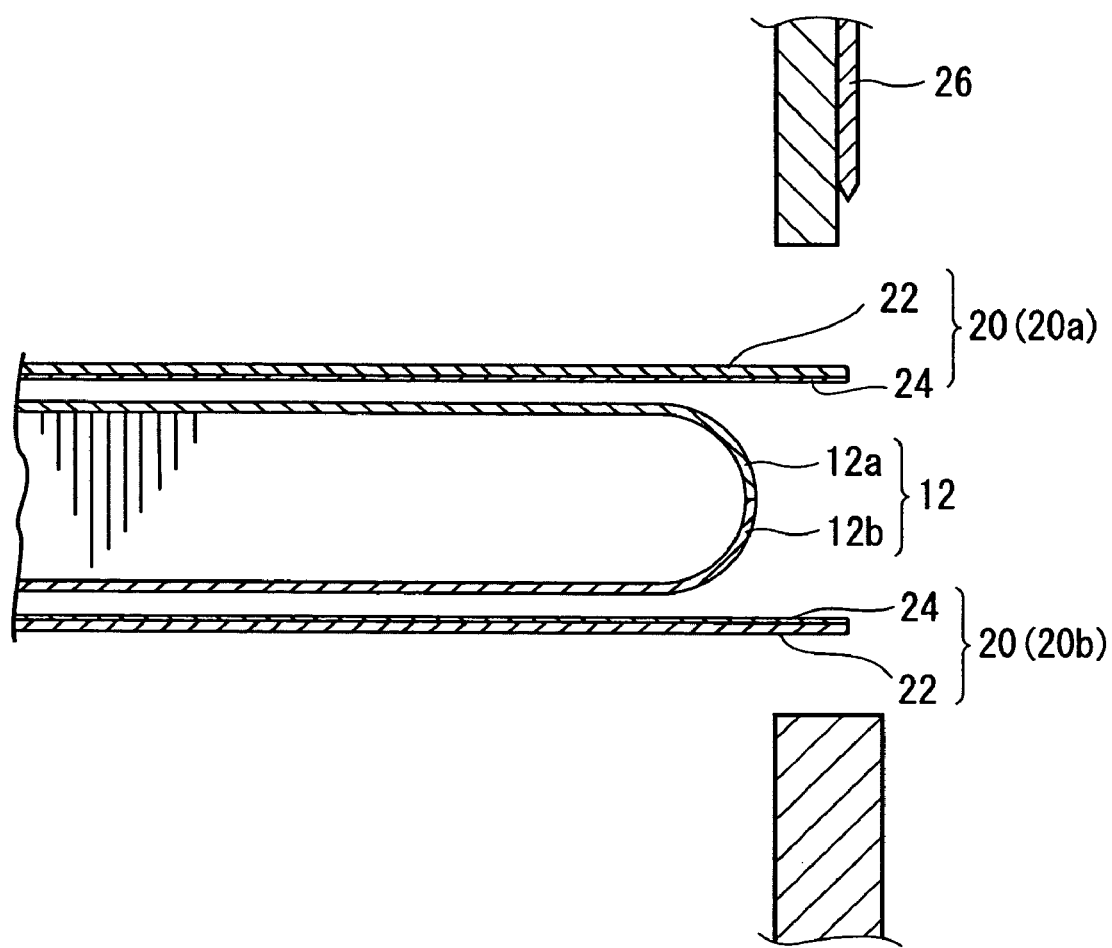
FIG. 2 is a sectional view illustrating a first step of a representative method of covering a visor body with a representative surface covering material.
Figure 3:
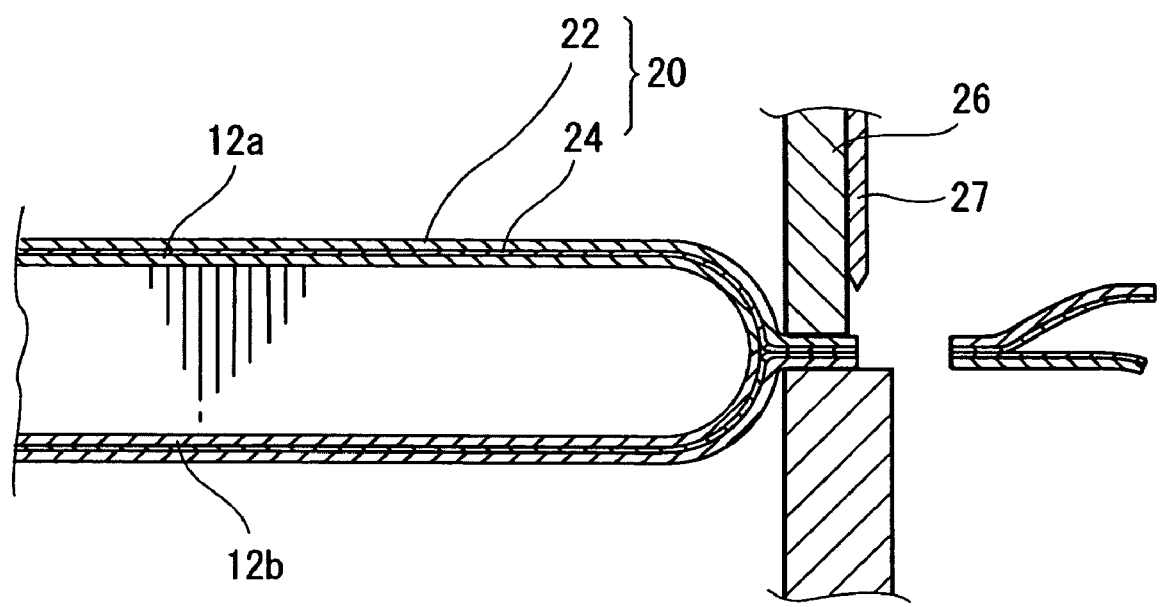
FIG. 3 is a sectional view similar to FIG. 2 but showing the subsequent step of the representative method.

A representative vehicle sun visor covered with the above representative surface covering material will now be described with reference to the drawings. Referring to FIG. 1, a representative sun visor 10 is shown in a perspective view and includes a visor body 12 as a major element. The visor body 12 is adapted to shield the light that may be incident into a vehicle cabin (not shown). The visor body 12 is mounted to a vehicle cabin ceiling via a substantially L-shaped support rod 14. The visor body 12 may have a hollow configuration and may be manufactured by an injection molding process of a thermoplastic resin, such as polypropylene. In this embodiment, the visor body 12 includes body halves 12a and 12b that are bonded to each other from opposite sides. However, any other known molding process may be used to mold the visor body 12, such as a blow molding process and bead foam molding process. The visor body 12 is covered with a surface covering material 20 that closely contacts the outer surface of the visor body 12. As seen in FIGS. 2 and 3, the surface covering material 20 has a non-woven fabric layer 22 and a synthetic resin layer 24 overlaid onto a back surface of the non-woven fabric layer 22.

FIGS. 2 and 3 are cross-sectional views showing a representative process for covering the visor body 12 with the surface covering material 20. As shown in these figures, in order to cover the visor body 12 with the surface cover material 20, the surface cover material 20 is first prepared as two separated sheets 20a and 20b. The sheets 20a and 20b are then respectively positioned on the upper and lower sides of the visor body 12 such that their synthetic resin layers 24 faces inward. Stretching over the surfaces of the sun visor body 12 tensions the sheets 20a and 20b. The sheets 20a and 20b are then bonded to each other at their peripheral edges along the outer periphery of the visor body 12 by a suitable welding device 26, such as an ultrasonic welder or a high-frequency welder. A cutter 27 trims the bonded peripheral edges of the sheets 20a and 20b (i.e., a flange removing process). As a result, a sun visor 10 may be manufactured including a visor body 12 covered with a surface covering material 20 that is tensioned along the surface of the visor body 12. The step of trimming the bonded peripheral edges may be performed simultaneously with the bonding step by the welding device 26 or the trimming step may be omitted if the step is not necessary.

Although the representative process utilizes welding in order to bond the peripheral edges of the sheets 20a and 20b to each other, the peripheral edges may be sewn together.

The surface covering material 20 of the vehicle sun visor 10 manufactured as described above has a good configuration recovery property in comparison with known surface covering materials. Therefore, potential sagging or creasing of the surface cover material 20 can be minimized during a long time period of use. For example, even if the heat of sunlight deforms the sun visor body 12, the surface covering material 20 can still be kept in a tensioned condition so as to maintain a good appearance of the sun visor 10.

In addition, according to the representative process, the tensile force that is needed to be applied to the surface covering material 20 (i.e., sheets 20a and 20b) during the process of covering the visor body 12 with the surface covering material 20 can be moderated. Therefore, the operability of the operation for covering the visor body 12 with the surface cover material 20 can be improved.

In order to verify the above advantages, the inventors of the present application have made the following tests:

Recovering Property Verification Test

The recovery rate of a stretched surface covering material back towards an original configuration has been measured according to the following procedure, with respect to various thickness of the synthetic resin layer:

First, 3.3 denier (1 denier=1 g/9,000 m) PET fibers having an average length of 51 mm were needle-punched to manufacture a non-woven fabric. A binder resin of modified acrylic resin containing a phosphate ester as a fire resistant agent was applied to the non-woven fabric. The weight per unit area of the non-woven fabric was 175 g/m². The weight per unit area of the binder resin was 25 g/m².

A sheet made of polypropylene resin was laminated onto the back surface of the non-woven fabric prepared as described above, preparing a surface covering material having a gauge size of 200 mm×50 mm. Eight samples were manufactured having polypropylene resin sheets with different amounts of thickness and non-woven fabrics with different orientations (e.g., lengthwise and widthwise directions) as test samples of the surface covering material. Here, the term "orientation" with regard to the fibers of the non-woven fabric is used to indicate an unwinding direction of the needle-punched non-woven fabric by an unwinding roller. In addition, the term "lengthwise direction" is used to indicate a direction along the side of the surface covering material having a gauge length of 200 mm. The term "widthwise direction" is used to indicate a direction along the side of the surface covering material having a gauge length of 50 mm. The particulars of the eight samples are shown in the following table:

TABLE

| SAMPLE NUMBER | THICKNESS OF RESIN SHEET (μm) | ORIENTATION OF FIBERS IN NON-WOVEN FABRIC | WEIGHT OF NON-WOVEN FABRIC (g/m²) | WEIGHT OF BINDER (g/m²) |
|---|---|---|---|---|
| 1 | 0 | LENGTHWISE | 175 | 25 |
| 2 | 30 | LENGTHWISE | 175 | 25 |
| 3 | 40 | LENGTHWISE | 175 | 25 |
| 4 | 50 | LENGTHWISE | 175 | 25 |
| 5 | 0 | WIDTHWISE | 175 | 25 |
| 6 | 30 | WIDTHWISE | 175 | 25 |
| 7 | 40 | WIDTHWISE | 175 | 25 |
| 8 | 50 | WIDTHWISE | 175 | 25 |

The eight prepared samples of the surface covering material were then sent in turn to a tensile tester that applied a tension to the eight samples in the lengthwise direction for two hours at an environmental temperature of 90°. After which, the eight samples were released from the tensile tester and placed at room temperature for two hours. The length of each sample was then measured in the lengthwise direction. Based on the measured data, the recovering rate of each sample was calculated by the following expression:

$$\text{RECOVERING RATE}(\%) = \frac{L - L'}{L - A} \times 100$$

where A: original length (200 mm)

L: length after tensioning (206 mm (original length+3%))

L': length after two hours of cooling at room temperature (mm)

Figure 4:
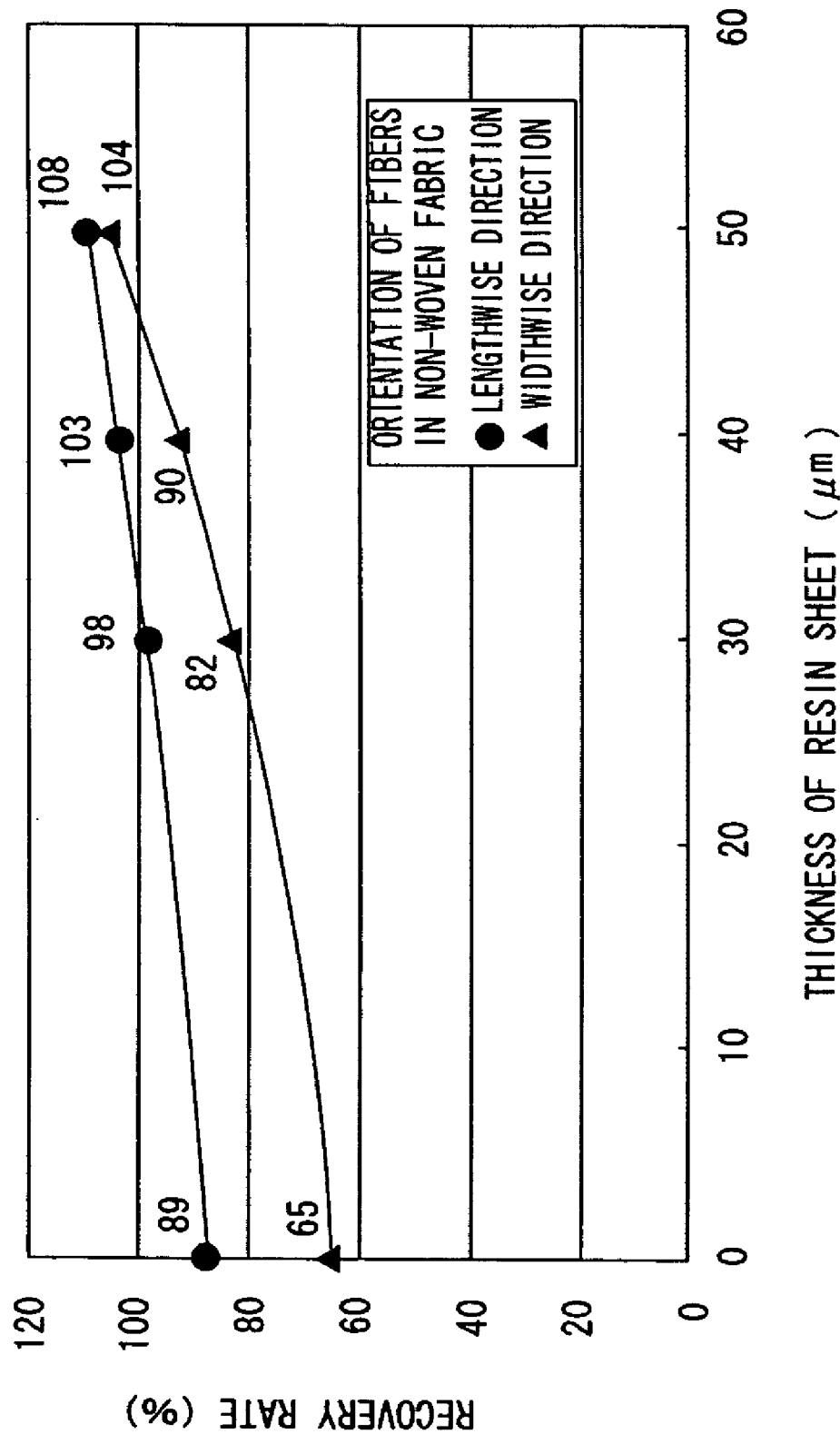
FIG. 4 is a graph showing the results of measurements of the recovery rates of representative surface covering materials.

As shown in FIG. 4, it has been verified that the recovery rate of the surface covering material is between 80% and 110% in cases where the thickness of the polypropylene resin sheet (i.e., the synthetic resin layer) is between 30 μm and 50 μm. In particular, in cases where the thickness of the polypropylene resin sheet is 40 μm, the measured recovery rate in the widthwise direction was 90% and the measured recovery rate in the lengthwise direction was 103%. These recovery rates are highly suited for a surface covering material. The recovery rate demonstrated by the above thickness range has resulted in a vehicle sun visor that may cause minimum creasing or sagging in the surface covering material.

Modulus Load Test

A modulus load (i.e., tensile load) that is applied to a surface covering material during stretching has been measured according to the following procedure, with respect to various amounts of thickness of the synthetic resin layer:

First, 3.3 denier PET fibers having an average length of 51 mm were needle-punched in order to manufacture a non-woven fabric. A binder resin of modified acrylic resin containing phosphate ester as a fire resistant agent was applied to the non-woven fabric. The weight per unit area of the non-woven fabric was 175 g/m². The weight per unit area of the binder resin was 25 g/m².

A sheet made of polypropylene resin was laminated onto the back surface of the non-woven fabric prepared as described above. A surface covering material having a gauge size of 200 mm×50 mm was prepared. Eight test samples of the surface covering material were prepared in the same manner as the eight samples shown in the above TABLE and used in connection with the test for measuring recovery rates.

The samples were then sent in turn to a tensile tester. The tests were made by applying a tensile force to each sample at a speed of 200 mm/min at room temperature. The modulus load applied to each sample surface covering material was then measured at a stretched length of 50 mm beyond the original length (lengthwise and widthwise). A graph indicating the result of the tests is shown in FIG. 5.

As shown in FIG. 5, it has been verified that a moderate modulus load is applied when the thickness of the synthetic resin sheet is between 30 μm and 50 μm. In particular, in cases where the thickness of the synthetic resin sheet is 40 μm, the load measured in the widthwise direction was 11.3 N and the load measured in the lengthwise direction was 31.4 N. These loads are highly suited for a surface covering material. The modulus loads indicated by the range of thickness described above enable the surface covering material to appropriately follow the surface of the visor body and improved the operability of an operation for covering the visor body with the surface covering material.

This invention claims:

1. A surface covering material for covering a sun visor body of use with a vehicle sun visor, comprising:
    a non-woven fabric layer; and
    a synthetic resin layer made of polypropylene resin overlaid onto a back surface of the non-woven fabric layer in order to closely contact the surface covering material with a surface of the sun visor body;
    wherein a thickness of the synthetic resin layer is within a range of 30 μm to 50 μm;
    wherein the non-woven fabric layer comprises a non-woven fabric having a weight per unit area within a range of 120 g/m$^2$ to 250 g/m$^2$; and wherein the non-woven fabric layer further comprises a binder resin contained in the non-woven fabric.

2. A surface covering material for covering a sun visor body of use with a vehicle sun visor, comprising:
    a non-woven fabric layer; and
    a synthetic resin layer overlaid onto a back surface of the non-woven fabric layer in order to closely contact the surface covering material with a surface of the sun visor body;
    wherein a thickness of the synthetic resin layer is within a range of 30 μm to 50 μm;
    wherein the non-woven fabric layer comprises a non-woven fabric made of polyester fibers and having a weight per unit area within a range of 120 g/m$^2$ to 250 g/m$^2$: and wherein the non-woven fabric layer further comprises a binder resin contained in the non-woven fabric.

3. A vehicle sun visor covered with the surface covering material as in claim 1.

4. A surface covering material for covering a vehicle sun visor, comprising:
    a non-woven fabric layer;
    a binder agent impregnating the non-woven fabric layer; and
    a synthetic resin layer connected to a surface of the non-woven fabric layer in order to closely contact the surface covering material with a surface of the sun visor body;
    wherein a density of the non-woven fabric layer is within a range of about 120 g/m$^2$ to 250 g/m$^2$; and
    wherein the synthetic resin layer is connected to the surface of the non-woven fabric layer via an adhesive layer; and
    wherein a thickness of the synthetic resin layer is within a range of about 30 μm and 50 μm.

5. A surface covering material for covering a vehicle sun visor, comprising:
    a non-woven fabric layer;
    a binder agent impregnating the non-woven fabric layer; and
    a synthetic resin layer connected to a surface of the non-woven fabric layer in order to closely contact the surface covering material with a surface of the sun visor body;
    wherein a density of the non-woven fabric layer is within a range of about 120 g/m$^2$ to 250 g/m$^2$; and
    wherein a thickness of the synthetic resin layer is within a range of about 30 μm and 50 μm; and
    wherein the connection between the synthetic resin layer and the non-woven material is established by heating a synthetic resin sheet and laminating the synthetic resin sheet directly onto the non-woven fabric layer.

6. A surface covering material for covering a vehicle sun visor, comprising:
    a non-woven fabric layer;
    a binder agent impregnating the non-woven fabric Layer; and
    a synthetic resin layer connected to a surface of the non-woven fabric layer in order to closely contact the surface covering material with a surface of the sun visor body;
    wherein a density of the non-woven fabric layer is within a range of about 120 g/m$^2$ to 250 g/m$^2$; and
    wherein the non-woven fabric layer comprises polyester fibers; and
    wherein a thickness of the synthetic resin layer is within a range of about 30 μm and 50 μm; and
    wherein a weight per unit area of binder is about 25 g/m$^2$; and
    wherein the binder agent comprises a fire resistant agent.

7. The surface covering material as in claim 6 wherein synthetic resin layer comprises a polypropylene resin.

8. A surface covering material for covering a vehicle sun visor, comprising:
    a non-woven fabric layer;
    a binder agent impregnating the non-woven fabric layer; and
    a synthetic resin layer connected to a surface of the non-woven fabric layer in order to closely contact the surface covering material with a surface of the sun visor body;
    wherein a density of the non-woven fabric Layer is within a range of about 120 g/m$^2$ to 250 g/m$^2$; and
    wherein a thickness of the synthetic resin layer is within a range of about 30 μm and 50 μm; and
    wherein the synthetic resin layer comprises a polypropylene material; and
    wherein a weight per unit area of binder is about 25 g/m$^2$.

9. A vehicle sun visor; comprising:
    a sun visor body
    surface covering material for covering the sun visor body, the surface covering material comprising:
        a non-woven fabric layer; and
        a synthetic resin layer attached to a back surface of the non-woven fabric layer in order to closely contact a surface of the sun visor body;

wherein a thickness of the synthetic resin layer is within a range of about 30 μm and 50 μm; and wherein a weight per unit area of the non-woven fabric layer is within a range of 120 g/m² to 250 g/m²; and wherein the non-woven fabric layer comprises polyester fibers; and wherein the non-woven fabric layer further comprises:

a binder agent; and wherein the binder agent comprises a fire resistant agent.

10. A vehicle sun visor, comprising:

a sun visor body surface covering material for covering the sun visor body, the surface covering material comprising:

a non-woven fabric layer; and a synthetic resin layer attached to a back surface of the non-woven fabric layer in order to closely contact a surface of the sun visor body;

wherein a thickness of the synthetic resin layer is within a range of about 30 μm and 50 μm; and wherein synthetic resin layer comprises a polypropylene resin; and wherein a weight per unit area of the non-woven fabric layer is within a range of 120 g/m² to 250 g/m²; and the non-woven fabric layer further comprises:

a binder agent; and wherein the binder agent comprises a fire resistant agent.

11. The surface covering material as in claim 4, wherein a weight per unit area of the binder is about 25 g/m².

12. The surface covering material as in claim 5, wherein a weight per unit area of the binder is about 25 g/m².

13. A vehicle sun visor covered with the surface covering material as in claim 2.

14. A vehicle sun visor covered with the surface covering material as in claim 4.

15. A vehicle sun visor covered with the surface covering material as in claim 5.

16. A vehicle sun visor covered with the surface covering material as in claim 6.

17. A vehicle sun visor covered with the surface covering material as in claim 10.

* * * * *